United States Patent
Yan et al.

(10) Patent No.: US 10,685,361 B2
(45) Date of Patent: Jun. 16, 2020

(54) TARGETING ADVERTISEMENTS TO GROUPS OF SOCIAL NETWORKING SYSTEM USERS

(75) Inventors: Rong Yan, Mountain View, CA (US); Nuwan Senaratna, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 949 days.

(21) Appl. No.: 13/411,456

(22) Filed: Mar. 2, 2012

(65) Prior Publication Data
US 2013/0232012 A1 Sep. 5, 2013

(51) Int. Cl.
*G06Q 30/02* (2012.01)
*G06Q 10/00* (2012.01)
*H04W 4/029* (2018.01)
*G06Q 50/00* (2012.01)
*H04L 12/18* (2006.01)

(52) U.S. Cl.
CPC ............ *G06Q 30/02* (2013.01); *G06Q 10/00* (2013.01); *G06Q 30/0215* (2013.01); *G06Q 30/0269* (2013.01); *G06Q 30/0275* (2013.01); *G06Q 50/01* (2013.01); *H04L 12/1859* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 8,812,419 B1 * | 8/2014 | Teller | G06Q 10/10 706/46 |
| 2006/0041470 A1 * | 2/2006 | Filho | G06Q 30/0269 705/14.64 |
| 2007/0061195 A1 | 3/2007 | Liu et al. | |
| 2007/0121843 A1 | 5/2007 | Atazky et al. | |

(Continued)

FOREIGN PATENT DOCUMENTS

| | | |
|---|---|---|
| JP | 2007-102407 A | 4/2007 |
| JP | 2010-515160 A | 5/2010 |

(Continued)

OTHER PUBLICATIONS

Inside Facebook "10 Powerful Ways to Target Facebook Ads" _Online_Jul. 27, 2009. Retrieved Mar. 12, 2015 [www.insidefacebook.com] _Internet Archive_. [http://web.archive.org/web/20090811091810/http://www.insidefacebook.com/2009/07/27/10-powerful-ways-to-target-facebook-ads-that-every-performance-advertiser-should-know].*

(Continued)

*Primary Examiner* — Michael J Sittner
(74) *Attorney, Agent, or Firm* — Fenwick & West LLP

(57) ABSTRACT

Embodiments of the present disclosure target advertising to a group of related users of a social networking system. To target advertising to a group of users, the social networking system receives targeting criteria specifying a group to receive an advertisement at substantially the same time. To identify a group of users of the social networking system satisfying the targeting criteria, the social networking sys- (Continued)

tem observes the interactions of connected social networking system users. Connected users interacting with each other in a manner that satisfies the targeting criteria may be added to a group. The social networking system serves the advertisement to a set of users included in the group because the served users are members of the group.

24 Claims, 4 Drawing Sheets

(56) References Cited

U.S. PATENT DOCUMENTS

| | | | |
|---|---|---|---|
| 2007/0208619 | A1 | 9/2007 | Branam et al. |
| 2008/0033808 | A1* | 2/2008 | Black ................ G06Q 30/0256 705/14.54 |
| 2009/0119167 | A1* | 5/2009 | Kendall ................ G06Q 30/02 705/14.17 |
| 2009/0216620 | A1 | 8/2009 | Lee |
| 2009/0228335 | A1 | 9/2009 | Niyogi et al. |
| 2010/0161408 | A1* | 6/2010 | Karson ................ G06Q 30/02 705/14.43 |
| 2010/0324996 | A1 | 12/2010 | Kim et al. |
| 2011/0145069 | A1* | 6/2011 | Tauriainen ......... G06Q 30/0258 705/14.56 |
| 2011/0179161 | A1* | 7/2011 | Guy et al. ..................... 709/224 |
| 2011/0264519 | A1* | 10/2011 | Chan .................... G06Q 30/02 705/14.49 |
| 2013/0151335 | A1* | 6/2013 | Avadhanam ........... G06Q 30/02 705/14.53 |
| 2013/0196689 | A1* | 8/2013 | Smith .................. H04W 4/206 455/456.3 |

FOREIGN PATENT DOCUMENTS

| | | |
|---|---|---|
| JP | 2010-537323 A | 12/2010 |
| JP | 2011-503701 A | 1/2011 |
| JP | 2011-087180 | 4/2011 |
| KR | 10-2002-0068638 A | 8/2002 |
| KR | 10-1001794 B1 | 12/2010 |
| KR | 10-2011-0044509 A | 4/2011 |
| WO | WO 2009/026395 A1 | 2/2009 |
| WO | WO 2010/102012 A2 | 9/2010 |

OTHER PUBLICATIONS

WikiHow "How to Use Facebook Places" _Online_Aug. 20, 2010. Retrieved Mar. 12, 2015 [www.wikihow.com] _Internet Archive_. [http://web.archive.org/web/20100820232101/http://www.wikihow.com/Use-Facebook-Places].*

PCT International Search Report and Written Opinion, PCT Application No. PCT/US2013/028915, dated Jun. 14, 2013, twelve pages.

Canadian Intellectual Property Office, Office Action, Canadian Patent Application No. 2,864,304, dated Nov. 14, 2016, five pages.

Japan Patent Office, Office Action, Japanese Patent Application No. 2014-560131, dated Dec. 20, 2016, nine pages.

Canadian Intellectual Property Office, Office Action, Canadian Patent Application No. 2,864,304, dated Dec. 31, 2015, four pages.

Australian Government, IP Australia, Examination report No. 1 for standard patent application, Australian Patent Application No. 2013225689, dated Jul. 11, 2017, three pages.

Japan Patent Office, Office Action, Japanese Patent Application No. 2014-560131, dated Jul. 25, 2017, ten pages.

Australian Government, IP Australia, Examination report No. 3 for standard patent application, Australian Patent Application No. 2013225689, dated Apr. 20, 2018, three pages.

Australian Government, IP Australia, Examination report No. 2 for standard patent application, Australian Patent Application No. 2013225689, dated Jan. 18, 2018, three pages.

Canadian Intellectual Property Office, Third Office Action, Canadian Patent Application No. 2,864,304, dated Sep. 29, 2017, eight pages.

* cited by examiner

TARGETING ADVERTISEMENTS TO GROUPS OF SOCIAL NETWORKING SYSTEM USERS

BACKGROUND

The present disclosure relates to advertisements served through a social networking system and in particular to advertisements directed to a group users of a social networking system based on social interaction among the users included in the group.

Advertisement revenue can provide an important revenue stream for social networking systems. More effective or targeted advertising typically generates greater advertisement revenue for advertisers compared to broad-based ads because the targeted ads are typically perceived by consumers as more relevant. And, by serving more relevant ads, advertisers can increase the conversion rate of viewers of the ads to purchasers of the proposed goods or services.

To improve an advertisement's relevance, advertisers use consumer data, such as websites visited or content viewed. But this approach often fails to provide insight into other dynamics that can affect a consumer's purchasing decision, online or otherwise. Limited by a user's individual online purchasing activity, advertisers lack sufficient information to leverage other dynamics affecting the consumer purchasing decision process to improve the relevance of their ads.

SUMMARY

Embodiments of the present disclosure target advertising to a group of related users of a social networking system. In many cases, advertising to a group of related users can be more effective than advertising to individuals, especially where the advertising relates to the way in which the group of users is connected. For example, a coupon for a restaurant delivered to a group of users who have previously checked in to or visited the restaurant is much more likely to be redeemed.

To target advertising to a group of users, in one embodiment, the social networking system receives targeting criteria specifying a group to receive an advertisement at substantially the same time. To identify a group of users of the social networking system satisfying the targeting criteria, the social networking system observes the interactions of connected social networking system users. Connected users interacting with each other in a manner that satisfies the targeting criteria may be added to a group. The social networking system serves the advertisement to a set of users included in the group because the served users are members of the group.

In operation, the social networking system may receive an advertisement and targeting criteria associated with the advertisement that define a group of users of the social networking system targeted to receive the advertisement. For example, the targeting criteria may specify a common interaction between at least two connected users of the group. The social networking system observes interactions between users of the social networking system, the observed interactions providing a basis for grouping connected users. For a set of users of the social networking system who are involved in one or more of the observed interactions that meet the targeting criteria, the social networking system includes the set of users in a group. The social networking system serves the advertisement to the set of users in the group based on the set of users belonging to the group. Further, the social networking system serves the advertisement to users in the group when another user in the group is served the advertisement.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
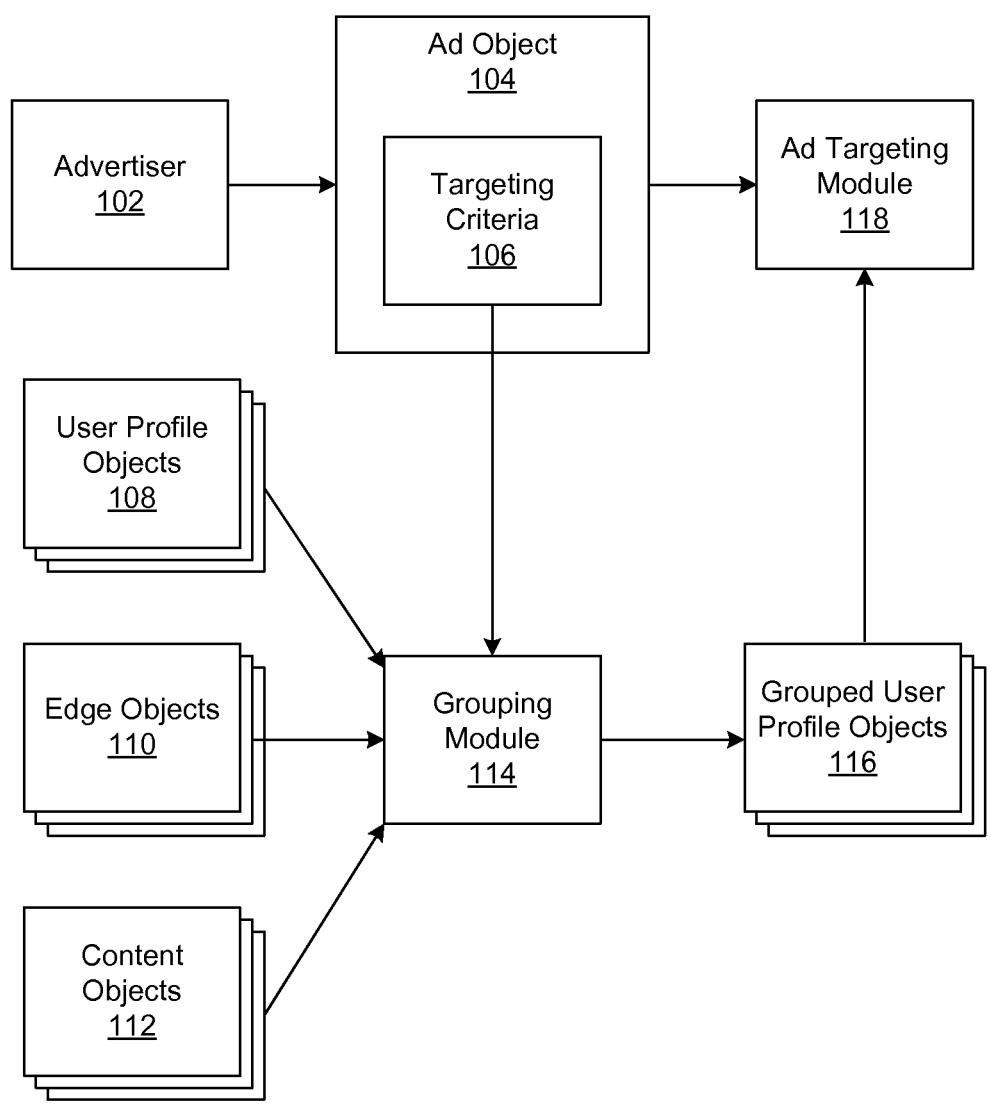
FIG. 1 illustrates a high level block diagram of an exemplary system for serving an advertisement to users of a social networking system, in accordance with an embodiment.

The figures depict various embodiments of the present disclosure for purposes of illustration only. One skilled in the art will readily recognize from the following discussion that alternative embodiments of the structures and methods illustrated herein may be employed without departing from the principles of the embodiments described herein.

DETAILED DESCRIPTION

Overview

Embodiments use social networking systems to serve advertisements to a group of connected users of the social networking system sharing a common interaction to improve advertisement effectiveness. By leveraging social factors, such common interactions between connected users, advertisers may improve the relevance of their ads. This may be particularly effective when the advertisement conveys to each user that the whole group is receiving a particular advertisement at substantially the same time. And, by further leveraging information associated with these common interaction, social networking systems may be able to serve ads better suited to a particular role a user plays within such a group.

One way embodiments serve advertisements to users of a social networking system is by receiving targeting criteria specifying a group to receive an advertisement at substantially the same time. To provide flexibility in how an advertiser may define a group of social networking users to receive an advertisement, the targeting criteria may be loosely defined to include a broad range of users having some type of common connection. Common connections may include, among other connection types, friends, co-workers, or family member. Alternatively or additionally, the targeting criteria may be narrowly defined to include connected users that have interacted with each other and/or an object in the social networking system. By better utilizing information related to interactions between millions of connect social networking users, social networking systems may group users in a very granular and particularized manner. Advertisers leveraging this information may develop advertisement precisely targeted at a particular group. The increased precision in defining a group provides advertisers with the unique ability to provide more relevant advertisement to millions of social networking system users.

In operation, the social networking system serves the advertisement to users that are members of the group in a manner that notifies each of the group members that the other members were also served the advertisement. Notifying group members that the advertisement was directed to the group improves the likelihood that the group members will perceive the advertisement as being relevant. And, because the group members perceive the advertisement to be more relevant, advertisers can increase the conversion rate of group members that view the advertisement to group members that purchase the proposed goods or services related to the advertisement. In turn, a social networking system serving the group targeted advertisement benefit from increased advertising revenue by enabling advertisers to target ads to a group of social networking users having a particular set of characteristics.

FIG. 1 illustrates a high level block diagram of a process of targeting advertisements to users of a social networking system because the users are members of a group, in accordance with one embodiment. Exemplary social networking system 100 includes an advertiser 102 that provides ad object 104 to the social networking system 100. In some embodiments, an advertiser 102 may provide an ad object 104 directly to the social networking system 100. While in other embodiments, an advertiser 102 may provide an object 104 to a social networking system 100 indirectly by using an ad network or ad exchange (not shown).

Ad object 104 may include an advertisement. An advertisement generally includes any communication intended to cause the recipient of the communication to take some action concerning a product or service. In some embodiments, an advertisement may include an offer for a deal. For example, an ad object 104 may include an offer for a holiday photography session for a group that includes four family members, which may be redeemed when all four family members check-in to the photographer's studio together before Nov. 9, 2011.

Ad object 104 also includes targeting criteria 106. Targeting criteria 106 specifies characteristics of a group of connected social networking system users to receive a particular advertisement. The characteristics may include a group of users who are themselves connected based on a particular interaction. For example, the targeting criteria 106 may include social networking users that all checked-in at a geographic location, such as a restaurant, together, individually, or within a period of time. The targeting criteria 106 may also include social networking users that attend or indicate a plan to attend a common event. An event may include any type of event, and may be a specific event such as attending the San Francisco Jazz Festival Matinee 2—Birth of the Cool at 11:00 am PST on Oct. 22, 2011, at the Herbst Theatre. In other embodiments, an event may be more general, such as a get-together at a friend's house. The targeting criteria 106 may also include social networking users that interact with a common object. For example, interaction with a common object may include being tagged in an image with connected social networking users, indicating a preference for the same or similar newsfeed item, posting, or sponsored story having one or more keywords related to the advertisement.

Interaction with a common object may also include perceiving the same or similar audio or video content object, such as listening to the same song or artist, viewing a particular video clip, or playing an online game. In another embodiment, targeting criteria may include a particular sequence in which common interactions are performed. For example, an advertiser may provide social networking system 100 with advertisement for a concert and direct the social networking system 100 to target the advertisement to a group of three or more users who are all friends and who have listened to the artist within the past month, or who have each checked in at that concert venue within the last year. As described in that embodiment, the targeting criteria may also include the number of connected users having performed one or more common interactions. The social networking system 100 may enable the targeting criteria to be as specific or as broad as desired by the advertiser. In another embodiment, the advertiser 102 may provide an ad object 104 without targeting criteria 106. In that embodiment, the ad targeting module 118 may analyze the content of the ad object 104 to infer a targeting criteria based on a fuzzy matching algorithm that may user the interaction type and/or types of connections between users in the group as features.

The grouping module 114 analyzes information about the users of the social networking system 100 retrieved from the user profile objects 108, edge objects 110, and content objects 112 to identify grouped user profile objects 116 that have been determined to include members sharing a common interaction satisfying the targeting criteria 106. An ad targeting module 118 receives the grouped user profile objects 116 identified by the grouping module 114 for serving the advertisement incorporated in the ad object 104 to one or more groups of users specified in the grouped user profile objects 116. The grouped user profile objects 116 may include information indicating a particular role of a user in relation to the group of users. For example, a role may include influencer, economic decision maker, initiator, end user, early adopter, purchaser, or other types of roles.

The ad targeting module 118 may serve the advertisement to user of the social networking system 100 through various types of communication channels, including, but not limited to, mobile devices executing native applications, text messages to mobile devices, websites hosted on a system external to the social networking system 100, and an advertisement delivery mechanism available on the social networking system 100, such as sponsored stories, banner advertisements, and page posts.

System Architecture

Figure 2:
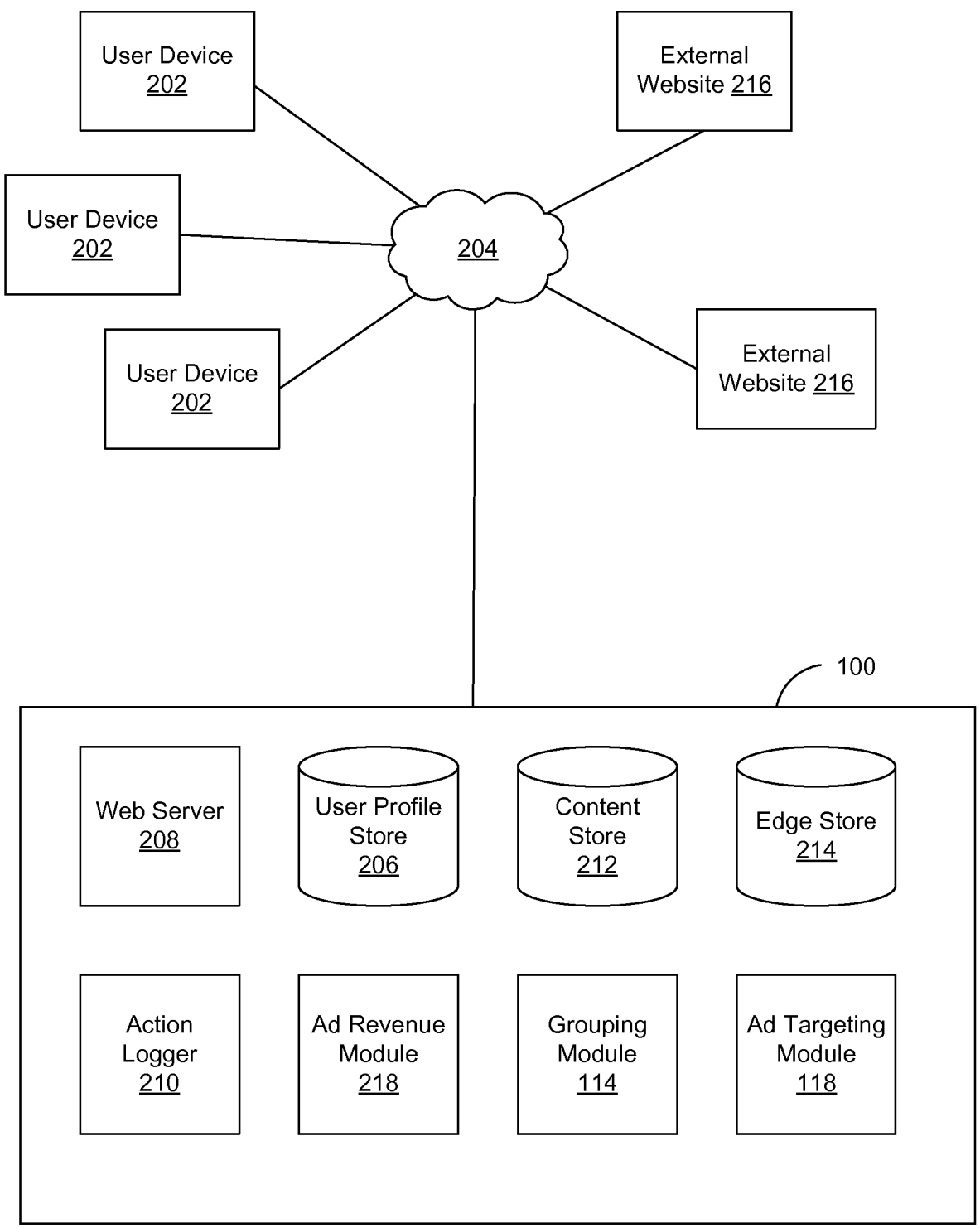
FIG. 2 illustrates a network diagram of an exemplary system for serving an advertisement to users of the social networking system, in accordance with an embodiment.

FIG. 2 illustrates a high level network diagram of an exemplary system 200 for serving an advertisement to users of the social networking system, in accordance with an embodiment. The system environment includes one or more user devices 202 coupled to the social networking system 100 and external websites 216 using network 204. Exemplary system 200 may be organized in an alternative topology or configuration, and include different and/or additional modules.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to receive an advertisement from the social networking system 100, or otherwise interact with the social networking system 100. In another embodiment, the user device 202 interacts with the social networking system 100 through an application programming interface (API) that runs on the native operating system of the user device 202, such as iOS and ANDROID™.

In one embodiment, the network 204 uses standard communications technologies and/or protocols. Thus, the network 204 can include wired and/or wireless links using technologies such as Ethernet, 802.11 family of standards, worldwide interoperability for microwave access (Wi-MAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a grouping module 114, an ad targeting module 118, a web server 208, an action logger 210, a content store 212, and an edge store 214. In other embodiments, the exemplary social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages exchanged using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID™, webOS, and RIM®.

The action logger 210 is capable of receiving communications from the web server 208 about user actions performed internal and/or external to the social networking system 100. The action logger 210 populates an action log with information about user actions to track them. Such actions may include, for example, adding a connection to the other user, sending a message to the other user, checking-in to the same location that the other user checked-in to, tagging or commenting on an image that includes the other user, reading a message from the other user, sharing links with the other user, viewing content associated with the other user, attending an event posted by the other user, among others. In addition, a number of actions described in connection with other objects are directed at particular users, so these actions are associated with those users as well. Action logger 210 may also populate an action log with information about user's interaction with a served advertisement. Interactions with an advertisement may include viewing an advertisement, clicking on an image or link, sharing the advertisement, or redeeming a deal included in the advertisement.

Action logger 210 may also populate an action log with metadata associated with user actions. Metadata, may include, for example, temporal data associated with when an action was performed or when an action is intended to be performed, and geographic data associated with the location of where an action was performed or where an action is intended to be performed.

An action log may also be used by a social networking system 100 to track users' actions on external websites that exchange information with the social networking system 100. For example, an e-commerce website that primarily sells personalized mobile computing devices at bargain prices may recognize a user of a social networking system 100 through social plug-ins that enable the e-commerce website to identify the user of the social networking system. Because users of the social networking system 100 are uniquely identifiable, e-commerce websites, such as this personalized mobile computing device reseller, may use the information about these users as they visit their websites. The action log records data about these users, including viewing histories, advertisements that were clicked on, purchasing activity, and buying patterns. Similar data recorded for each user of the social networking system may be provided to grouping module 114 to group users based in part on their common interactions on external websites.

User account information and other related information for users are stored as user profile objects 108 in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 206 also maintains references to the actions stored in an action log and performed on objects in the content store 212.

The edge store 214 stores the information describing connections between users and other objects on the social networking system 100 in edge objects 110. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user.

Multiple interactions between a user and a specific object may be stored in one edge object in the edge store 214, in one embodiment. For example, a user that plays multiple songs from Miles Davis' album, "Kind of Blue," may have multiple edge objects for the songs, but only one edge object for Miles Davis.

A grouping module 114 receives targeting criteria 106 included in ad objects 104 that are stored in the content store 212, in one embodiment. Using information about users of the social networking system 100, from user profile objects 108 retrieved from the user profile store 206, edge objects 110 retrieved from the edge store 214, and content objects 112 retrieved from the content store 212, the grouping module 114 may form groups of users that have some common connection or that have interacted in some way that identifies the users as being a particular group of users as specified in the targeted event criteria 106. For example, social networking system 100 may receive a request from an advertiser to target an advertisement to parties of users who have previously checked-in to a location, or more generally, the request may specify any edge, or interaction, with any node, or object, in the social networking system 100. Using the grouping 114, the social networking system 100 then identifies groups of users who have performed the check-in action (or who have been checked in by another user) on that location together. In other words, the grouping module 114 finds a group of users who have performed an action specified in the advertisement request to target an advertisement to parties in a way that is connected. In some embodiments, an action specified by the advertiser may not necessarily include object. For example, to advertise for a local marathon, a request may be targeted to a group of users who have "run" together by defining actions like "run," where users can tag other users in that action.

An ad targeting module 118 may receive targeting criteria for advertisements targeted to a particular group of users of a social networking system 100. As described above, a group described in the targeting criteria 106 may be four or more users who are all friends and who have listened to a particular artist within the past month, or who have each checked in—together or individually—at that concert venue within the last year. The ad targeting module 118 provides advertisements to a particular group of users of the social networking system 100 based on the targeting criteria 106 of the advertisements. In one embodiment, targeting criteria 106 may be received for advertisements and processed by the grouping module 114. After the grouping module 114 forms one or more groups of users of the social networking system 100 that meet the targeting criteria 106, the ad targeting module 118 may serve the advertisement to those identified groups of users.

Generally, the ad targeting module 118 serves the advertisement to a set of users in a group formed by grouping module 114 at a time when another user in the group was served the advertisement. The number of users included in the set of users may be defined in targeting criteria as a minimum number or a number range of group members to receive an advertisement. Alternatively, the number of users included in the set of users may be determined by the social networking system 100, such as by grouping module 114.

Ad targeting module 118 may present the advertisement to a set of users of the group when ad targeting module 118 receives an indication that one or more of the set of users accessed a web page associated with the social networking system. Along with the advertisement, ad targeting module 118 may present to the set of users an indication that the advertisement was sent to this particular set of users. For example, the indication may identify the other users of the set of users by their user name, screen name, or other characteristics indicative of a users' identity. In some embodiments, the advertisement may include an interface to like, share, or comment within the advertisement. These actions may then be communicated to the other users in the group. By providing this interface, social networking system 100 may start a conversation with the group about acting on the advertisement, which may make the communication of the audience/group in the advertisement much more effective.

Alternatively or additionally, the ad targeting module 118 may serve the advertisement to each member of the group specified in targeting criteria 106 in a manner suitable to present the advertisement to each member of the group at substantially the same time, such as serving the advertisement to a set of group members within a range 5 to 20 milliseconds or other minimum delivery window suitable to present the content user devices 202 across network 204. In other embodiments, the ad targeting module 118 may serve the advertisement to each member of the group simultaneously. In other embodiments, ad targeting module 118 may serve the advertisement to each member of the group specified in targeting criteria 106 using push technology, such as e-mail or text messaging.

The ad revenue module 218 may manage payments received from advertisers related to serving advertisements. In one embodiment, the social networking system 100 may charge advertisers based in part on the number of users of a particular group that were served a particular advertisement. For example, in targeting an advertisement for a New Year's Eve 2011 Las Vegas deal, an advertiser may specify in the targeting criteria 106 a group having a minimum of six users, each group member being friends with at least three other group members, and having checked-in at a particular hotel in Las Vegas on New Year's Eve within the last three years. In this example, ad revenue module 218 may determine pricing for serving the advertisement based in part on the number of served users that accessed the advertisement using the social networking system 100. For example, ad revenue module 218 may set a first pricing level based on a minimum number of served users in a group that accessed the advertisement, and set a second pricing level when the number of served users exceeds the minimum number specified in the targeting criteria 106. For the second pricing level, ad revenue module 218 may adjust the second pricing level in an incremental fashion based on the number of served users exceeding the minimum number of served users that accessed the advertisement. As a result, advertisers benefit from being charged based on when an advertisement targeted to a particular group is actually access by a minimum number of group members, and at substantially the same time.

Forming a Group Using a Social Networking System

Figure 3:
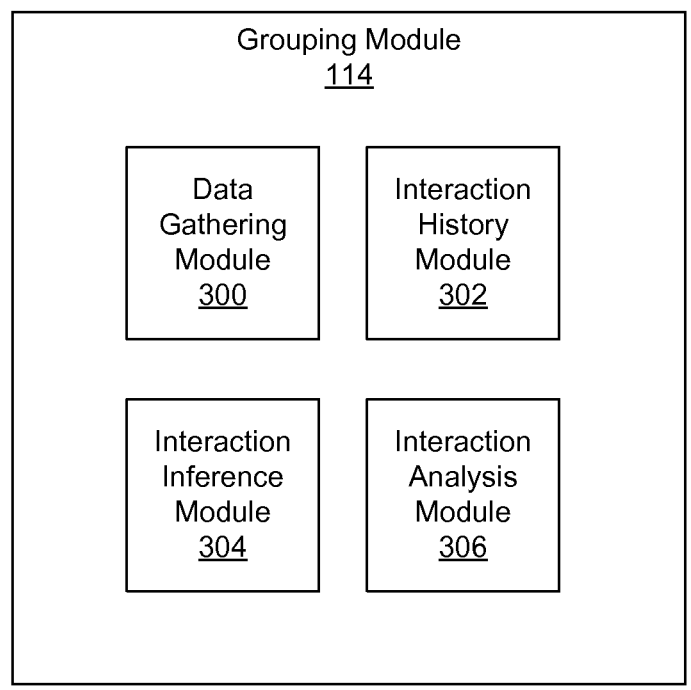
FIG. 3 illustrates a high level block diagram illustrating an exemplary grouping module that includes various modules for serving an advertisement to users of a social networking system, in accordance with an embodiment.

FIG. 3 illustrates a high level block diagram illustrating an exemplary grouping module 114, in accordance with an embodiment. The grouping module 114 includes a data gathering module 300, an interaction history analysis module 302, an interaction inference module 304, and a group forming module 306. The modules may operate in conjunction with each other or independently to form groups of social networking users that satisfy the targeting criteria 106.

A data gathering module 300 retrieves information about users with respect to group characteristics specified in targeting criteria 106 included in an ad object 104, including information from user profile objects 108, edge objects 110, and content objects 112. The data gathering module 300 may retrieve user profile objects 108. As previously described, user profile objects 108 also include references to the actions stored in an action log and performed on objects in the content store 212 that are related to an advertisement described in the targeting criteria 106. The user profile objects 108 that are related to an advertisement described in the targeting criteria 106 may include a content post that includes one or more keywords related to the advertisement. Such a content post may include, for example, a status update, comment, or photo upload. The user profile objects 108 that are related to an advertisement described in the targeting criteria 106 may also include objects having a temporal component, a geographic location component, and a conceptual component of the connected users related to the advertisement described in the targeted criteria 106.

An interaction history analysis module 302 analyzes the past common interactions between connected users associated with retrieved user profile objects 106 provided by the data gathering module 300. In one embodiment, the history of common interactions between connected users may be analyzed by the interaction history analysis module 302 in conjunction interaction inference module 304 to determine a likelihood of whether a particular connected user may perform a particular common interaction relevant to the advertisement at a later date.

A group forming module 306 forms groups that include one or more sets of connected users involved in one or more interactions observed by action logger 210 that meet the targeting criteria 106. Data gathered from data gathering module 300 may be provided to the group forming module 306 to form one or more groups of social networking users targeted to receive, as a group, an advertisement relevant to the type of connections and type of common interactions shared between the set of users included in the group.

To form groups based on type of connections, the grouping module 306 may analyze affinity between connected users. Using affinity information from edge objects 110, grouping module 306 may group connected users based in part on the strength of the respective connections. By doing so, the grouping module 306 may form groups that include users having connections between them of varying strengths. In other embodiments, affinity information may not be used by grouping module 306 to group connected users. For example, in some cases a social networking user may have a very low affinity for another social networking user with whom the social networking user is connected to as a "friend." But, these social networking users have attended a concert together in the past, indicating a common interest. This common interest may provide a basis for grouping module 306 to group these users together based on a request to target an advertisement for new compact disc (CD) from that band that played at the concert. By doing so, the connected social networking friends that have a very low affinity based on musical taste, would still receive the advertisement for the CD as a group so that they could talk about it. In other embodiments, the grouping module 306 may form a group based in part on whether the connected users is tagged in a common image. Alternatively or additionally, the grouping module 306 may form a group based on the number of distinct types of common interactions performed by the connected user. For example, the grouping module 306 may receive an ad object 104 that includes the targeting criteria 106 describing an advertisement targeting a family of four with children ages six an under interested traveling to the Caribbean on a cruise ship during November and December. Responsive to receiving this ad object 104, grouping module 306 may form a group to include married users: that reside in the southeastern United States that have at least two children, ages four to six; which have accessed websites related to Caribbean cruise travel; previously traveled on a cruise; indicated they would consider traveling on a cruise in a posting; and tagged in an image taken during a vacation in November or December. In other embodiments, the grouping module 306 may also form groups based in part on the frequency of occurrence of one or more of a plurality of common interactions over a period of time. Other factors and/or information considered by grouping module 306 to form a group include, but are not limited to, a particular number or number range of connected users, or an indication of activity with the social networking system. For example, an indication of activity with the social networking system may be represented by an activity threshold related to how often a user uses the social networking system during a twenty-four hour, one week, and one month periods, and during each use, how long does the user use the social networking system.

Figure 4:
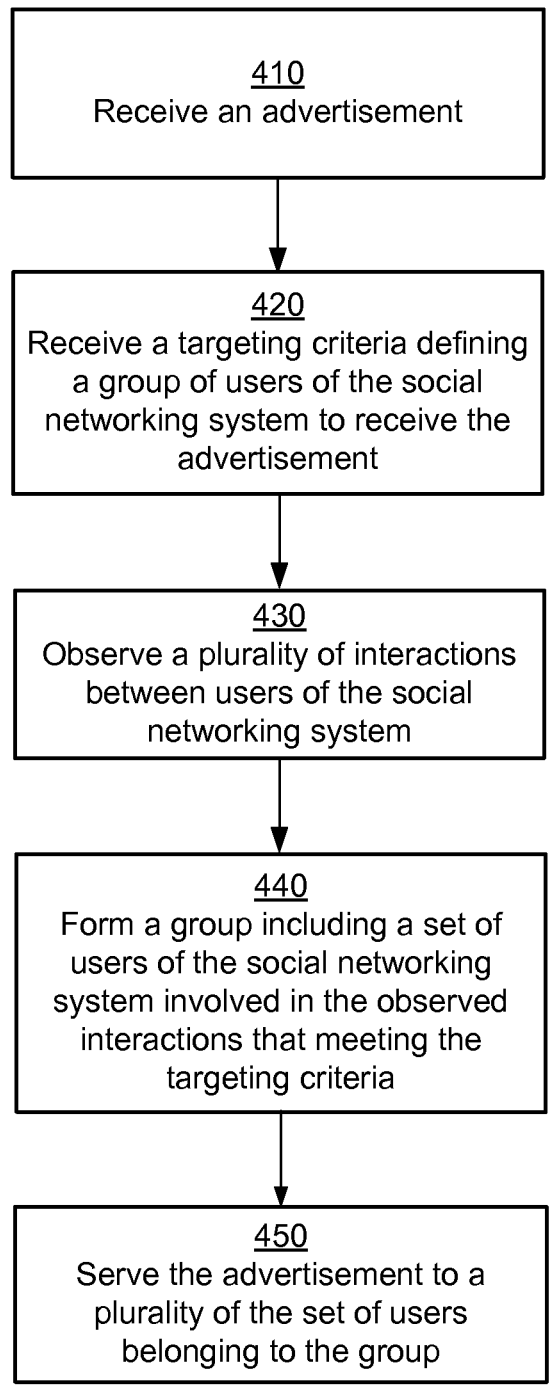
FIG. 4 illustrates a flowchart of an exemplary process for serving an advertisement to users of a social networking system, in accordance with an embodiment.

FIG. 4 illustrates a flowchart of an exemplary process 400 for serving an advertisement to users of a social networking system, in accordance with an embodiment. A social networking system 100 receives 410 an advertisement and receives 420 targeting criteria 106 that describes a group of social networking users which the advertisement should be targeted. As previously described, the definition of the group included in the targeting criteria 106 specifies some common connection type and/or common interaction between users in the group. In some embodiments, common interactions may include checking-in to a location related to the advertisement, together, individually, or within a period of time relative to another user checking-in to the location.

Interactions between users of the social networking system 100 are observed 430. For example, interactions may include actions internal or external to the social networking system 100, such as sending a message to the other user, tagging or commenting on an image that includes the other user, reading a message from the other user, sharing links with the other user, viewing content associated with the other user, inviting another connected user to an event included in a posting by the other user, among others. In other embodiments, common interactions may also include interactions with an advertisement, such as viewing an advertisement recommended by another connected user and sharing the advertisement with another connected user.

After the interactions between connect users of the social networking system 100 have been observed, the social networking system 100 forms groups 440 that include a set of users of the social networking system involved in the observed interactions that meet the targeting criteria 106. To form groups based on type of connections, the social networking system 100 analyzes the types of connections between users, and the interactions shared between connected users. Connected users having common interactions meeting the targeting criteria are included in one or more groups. Common interactions between connected users may be used by the social networking system as an indication that the connected users socialize as a group in a manner relevant to the subject matter of the advertisement. And, because the advertisement is targeted at a group of people, such as friends attending a music concert together, a family traveling together to a vacation destination, or business professionals attending a sporting event, the effectiveness of the advertisement may be affected by the particular characteristics of the group receiving the advertisement. In other embodiments, social networking system 100 may form a group based on an indication of the activity level of a particular user with the social networking system 100. For example, a user that accesses the social networking system 100 less than once a week may be perceived by the social networking system 100 as having activity level less than an activity threshold. A user that accesses the social networking system 100 infrequently may be less likely to access an advertisement served using the social networking system 100. Yet, as previously discussed, an advertisement targeted to a group because of a common interaction shared between users included in the group, is more likely to be effective, especially when the advertisement conveys to each user that whole group has accessed the advertisement. And, therefore the social networking system 100 may exclude users of the social networking system 100 having an activity level less than an activity threshold from being included in groups to improve the likelihood that served advertisement will be accessed by all users included in a group.

After forming one or more groups, social networking system 100 serves 450 the advertisement included in the ad object 104 to the members of the group. To improve the effectiveness of the advertisement, social networking system 100 serves the advertisement to a minimum set of users included in the group along with a notification that the advertisement was presented to the minimum set of users. For example, in some embodiments, the social networking system 100 serves the advertisement to the set of users at a time when another user in the group was served the advertisement, or when the social networking system 100 receives an indication that one or more of the set of users accessed a web page associated with the social networking system 100. In other embodiments, the social networking system 100 may serve the advertisement to each member of the group at substantially the same time, simultaneously, or in any other manner suitable to ensure that the advertisement is presented to the maximum number of users included in the group.

In other embodiments, the served advertisement may include an offer for a deal to be redeemed by the group of social networking users which accessed the served advertisement. Such a deal may be activated when a minimum number of users included in the group redeem the deal within a period of time specified by the advertiser and/or the social networking system 100. Once activated, the user of the social networking system 100 may purchase the goods or services associated with the deal.

In other embodiments, the social networking system 100 may serve the advertisement to a user included in the group, along with information personalized to the role of that user within the group. For example, an advertisement for back to school clothing may target a family that includes father, mother, and a daughter, ranging in age from eight to thirteen, that shared links to back to school clothing offered by a particular retailer. Historical information, captured by social networking system 100, concerning the interactions between father, mother, and daughter on the social networking system 100 may indicate the roles of the users included in the group as follows: the mother is the economic decision maker, the father is the purchaser, and the daughter is the influencer. Accordingly, the social networking system may serve the advertisement to the group along with information personalized to the determined roles of the users included in the group. For example, personalized information included in the father's advertisement emphasizes ease of purchase, personalized information included in the mother's advertisement focuses on value, and the personalized information included in the daughter's advertisement recommends higher margin products reflective of the latest fashion trends for her demographic.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   receiving, at a social networking system, a request to provide an advertisement to a group of users of the social networking system within a specified time period, the request including:

a specified characteristic of at least one common interaction to be performed between connected users in the group of users within a specified time interval;
a specification of at least a minimum number of users to be included in the group; and
a specification that the group of users includes at least two users that are connected in the social networking system;
observing, by the social networking system, a plurality of interactions between users of the social networking system;
identifying, by the social networking system, users having one or more observed interactions having the specified characteristic of the at least one common interaction included in the request, the at least one observed common interaction performed between connected users in the group of users within the time interval specified in the request, where the social networking system determined at least a threshold affinity between connected users in the group of users;
maintaining an edge store by the social networking system, the edge store containing information describing a plurality of connections between users of the social networking system;
retrieving from the edge store one or more connections within the social networking system between the identified users;
selecting a candidate group of users from identified users connected to other identified users, the candidate group of users including two or more identified users each connected to at least one other identified user via the social networking system, and the candidate group of users including at least the minimum number of users specified in the request;
identifying a viewing user of the social networking system included in the candidate group of users;
determining that at least one user from the candidate group of users other than the viewing user has been presented with the advertisement; and
sending the advertisement to a client device for display to the viewing user included in the candidate group of users within the specified time period included in the request of a time when the at least one user from the candidate group of users other than the viewing user was presented with the advertisement in response to the determining.

2. The method of claim 1, wherein the at least one common interaction included in the request comprises checking in to a location related to the advertisement.

3. The method of claim 1, wherein the at least one common interaction included in the request comprises attending an event related to the advertisement.

4. The method of claim 1, wherein the at least one common interaction included in the request comprises planning to attend an event related to the advertisement.

5. The method of claim 1, wherein the at least one common interaction included in the request comprises interacting with a thread or post, the thread or post including one or more keywords related to the advertisement.

6. The method of claim 1, wherein the at least one common interaction included in the request comprises interacting with a common object associated with the social networking system.

7. The method of claim 6, wherein the object comprises an image related to the advertisement.

8. The method of claim 1, wherein the one or more of the plurality of common interactions comprises listening to an audio object related to the advertisement.

9. The method of claim 1, wherein the candidate group of users is formed based at least in part on an affinity between the connected users.

10. The method of claim 1, wherein the group is formed based at least in part on whether the connected users are tagged in a common image.

11. The method of claim 1, wherein the group is formed based at least in part on a number of distinct types of common interactions performed by the connected users.

12. The method of claim 1, wherein the group is formed based at least in part on a frequency of occurrence of one or more of a plurality of common interactions over a period of time.

13. The method of claim 1, wherein the group is formed based at least in part on a number connected users to be included in the group.

14. The method of claim 1, wherein the group is formed based at least in part on an account activity threshold associated with the connected users.

15. The method of claim 1, wherein sending the advertisement for display to the plurality of the users in the group comprises sending the advertisement to a minimum number of users of the group.

16. The method of claim 1, wherein sending the advertisement for display to the viewing user based on the determining comprises pushing the advertisement to the set of users.

17. The method of claim 1, wherein sending the advertisement for display to the plurality of the users in the group comprises sending the advertisement when an indication that one or more of the set of users accessed a web page associated with the social networking system.

18. The method of claim 1, further comprising:
including, in the advertisement, an indication that the advertisement was sent to one or more other users of the candidate group.

19. The method of claim 1, further comprising:
determining for at least one user of the group, a role based on observed interactions of users of the group;
receiving personalized content associated with the role; and
including the personalized content in the advertisement to be sent to the user of the group associated with the role.

20. The method of claim 1, further comprising receiving payment from an advertiser when receiving an indication that a minimum number of users of the candidate group of users viewed the advertisement.

21. The method of claim 20, comprising receiving an incremental payment from the advertisers when receiving an indication that greater than the minimum number of users of the candidate group of users viewed the advertisement.

22. The method of claim 1, wherein the advertisement includes an offer for a deal, the method further comprising:
when the deal is redeemed by a minimum number of users of the group, activating the deal for the users of the group, wherein activation enables the users of the group to purchase the deal.

23. The method of claim 1, further comprising:
observing an interaction with the advertisement by one or more users of the group; and
responsive to observing the interaction with the advertisement, sending a notification to the other users of the group indicating the interaction.

24. A method comprising:
maintaining an edge store by a social networking system, the edge store containing information describing a plurality of connections between users of the social networking system;
receiving, at the social networking system, and ad request to provide an advertisement to a group of users of the social networking system within a specified time period, the request including:
- a specified characteristic of connected users of the social networking system corresponding to a specified time interval;
- a specification that there be at least a minimum number of users in the group; and
- a specification that the group of users include at least two users that share a connection;

observing one or more interactions between users of the social networking system;
- identifying connected users having the specified characteristic specified in the request, the specified characteristic of the identified connected users corresponding to the time interval specified in the request, where the social networking system determined at least a threshold affinity between connected users in the group of users;

receiving, from the edge store, one or more connections within the social networking system between the identified users;

selecting a candidate group users from the identified users who are connected to at least one other identified user via the social networking system identified connected users, the candidate group users including two or more identified users each connected to at least one other identified user via the social networking system, the candidate group of users having the specified characteristic that is specified in the request, and the candidate group of users including at least the minimum number of users specified in the request;

identifying a viewing user of social networking system that belongs to the candidate group of users;

determining that at least one user from the candidate group of users other than the viewing user has been presented with the advertisement; and sending the advertisement for display to a client device for presentation to the viewing user of the social networking system within the specified time period included in the request of a time when the at least one user from the candidate group users other than the viewing user was presented with the advertisement in response to the determining.

* * * * *